United States Patent
Lohmann et al.

(10) Patent No.: US 8,463,559 B2
(45) Date of Patent: Jun. 11, 2013

(54) METHOD FOR TRANSMITTING A SOFTWARE MODULE TO A MEASURING POINT

(75) Inventors: Martin Lohmann, Gerlingen (DE); Ulrich Kaiser, Basel (CH); Tobias Mieth, Dresden (DE); Sven-Matthias Scheibe, Dresden (DE); Reinhard Weiss, Leonberg (DE); Jochen Betz, Dietzingen (DE)

(73) Assignee: Endress + Hauser Conducta Gesellschaft für Mess-und Regeltechnik mbH + Co. KG, Gerlingen (DE)

( * ) Notice: Subject to any disclaimer, the term of this patent is extended or adjusted under 35 U.S.C. 154(b) by 505 days.

(21) Appl. No.: 12/734,497

(22) PCT Filed: Nov. 5, 2008

(86) PCT No.: PCT/EP2008/065005
§ 371 (c)(1),
(2), (4) Date: May 5, 2010

(87) PCT Pub. No.: WO2009/060001
PCT Pub. Date: May 14, 2009

(65) Prior Publication Data
US 2010/0312491 A1    Dec. 9, 2010

(30) Foreign Application Priority Data

Nov. 6, 2007 (DE) .......................... 10 2007 053 223

(51) Int. Cl.
*G01N 31/00* (2006.01)
(52) U.S. Cl.
USPC .......................................................... 702/31
(58) Field of Classification Search
USPC ............................................................ 702/31
See application file for complete search history.

(56) References Cited

U.S. PATENT DOCUMENTS

| | | | | |
|---|---|---|---|---|
| 7,785,151 | B2 * | 8/2010 | Feucht et al. ................. | 439/660 |
| 2006/0254911 | A1 * | 11/2006 | Lindmueller et al. ........ | 204/424 |
| 2009/0299700 | A1 * | 12/2009 | Babel et al. ................... | 702/188 |

FOREIGN PATENT DOCUMENTS

| | | |
|---|---|---|
| DE | 691 12 630 T2 | 5/1996 |
| DE | 197 55 516 A1 | 6/1999 |
| DE | 102 21 772 A1 | 11/2003 |
| DE | 103 13 389 A1 | 10/2004 |
| DE | 103 13 639 A1 | 10/2004 |

(Continued)

*Primary Examiner* — Aditya Bhat
(74) *Attorney, Agent, or Firm* — Bacon & Thomas, PLLC

(57) ABSTRACT

Method for operating a measuring point having a base unit and a sensor unit, wherein the latter couples via a pluggable connector coupling with the base unit; the base unit serves for energy supply of the sensor unit, for data exchange with the sensor unit and for communication with a process monitoring installation, wherein the base unit includes: A first element of the pluggable connector coupling; a first microprocessor sensor data conditioning for communication with the process monitoring installation; a first data memory for saving measuring-point-specific data; wherein the sensor unit has a primary sensor and a sensor head; the primary sensor includes a transducer, which outputs a measured variable dependent signal; wherein the sensor head includes: A circuit for conditioning the transducer signals with an A/D converter and a second microprocessor for measurement signal processing, a second data memory for sensor data; a program memory which contains a firmware; and an interface with a second element of the pluggable connector coupling; wherein a software module is transmitted from the base unit to the sensor unit and is stored in the program memory of the sensor unit, for enabling supplementary functions for primary sensor monitoring.

7 Claims, 1 Drawing Sheet

FOREIGN PATENT DOCUMENTS

| | | |
|---|---|---|
| DE | 10 2004 012 420 A1 | 9/2005 |
| DE | 10 2004 063 469 A1 | 7/2006 |
| DE | 10 2006 020 341 A1 | 10/2007 |
| EP | 1 659 489 A1 | 5/2006 |

\* cited by examiner

METHOD FOR TRANSMITTING A SOFTWARE MODULE TO A MEASURING POINT

TECHNICAL FIELD

The present invention concerns a method for operating a measuring point for determining a value of a physical or chemical, measured variable of a medium, wherein the measuring point includes a base unit and a sensor unit, wherein the sensor unit is releasably connected with the base unit via a pluggable connector coupling;

the base unit is provided for the energy supply of the sensor unit, for the data exchange with the sensor unit and for communicating a signal representative of the value of the measured variable to a process monitoring installation; wherein the base unit includes: a first element of the pluggable connector coupling;

a first microprocessor for conditioning data, which has been received by the sensor unit, for communication with the process monitoring installation; a first data memory for saving measuring-point-specific data; wherein additionally the sensor unit has a primary sensor and a sensor head; wherein the sensor head is firmly connected to the primary sensor;

the medium acts on the primary sensor, which includes a transducer with a signal output, which outputs an electrical signal that is dependent on the value of the measured variable, wherein the transducer has a variable transfer function;

wherein the sensor head includes: a circuit for conditioning the transducer signals, wherein the circuit has an A/D converter and a second microprocessor for processing the digitized signals;

a second data memory, in which sensor-specific data are stored; a program memory, which contains a low-level software with base functionalities for the operation of the sensor unit; and an interface, via which energy supply of the sensor unit by the base unit and data exchange with the base unit occur, wherein the interface includes a second element of the pluggable connector coupling.

BACKGROUND DISCUSSION

Such measuring points are, for example, pH-measuring points or other measuring points of analytical measurement technology. In this category belong especially other potentiometric, amperometric, coulometric, colorimetric, photometric, turbidithetric and spectrometric measuring points.

The problem that underlies the invention will be explained on the basis of an example of pH-measuring points; however, the invention should not be limited to a method for the operation of pH-measuring points.

As initially mentioned, the transducers of the primary sensors display a variable transfer function. This is especially true for pH-sensors. Therefore, pH-sensors or pH-electrodes must be calibrated at appropriate points in time. It is, however, not simple to determine the point in time of the next calibration exactly, since this can fluctuate from measuring point to measuring point and from calibration to calibration.

Correspondingly, pH-sensors or pH-electrodes need to be replaced after a service life, which varies from measuring point to measuring point, and, if not replaced, they must at least be cleaned or reconditioned in some other manner.

Different state of the art approaches are known for estimating reasonable prognoses for the time of the next calibration, or the remaining service life of a pH-electrode. For this, the time development of the calibration data can be tracked. Here, by a trend analysis of calibration data, it is ascertained when the next calibration is required, or when the displacement of the primary signal of the converter has progressed so far from the original values, that a calibration is no longer possible. Another approach for the prognosis of the remaining service life of a sensor is based on the summation of loading equivalents, to which the sensor is exposed at a measuring point.

Finally, both methods can be combined with one another, namely the trend analysis of the calibration data and the summation of loading equivalents, wherein, for example, first the remaining time up to a calibration or maintenance measure is estimated on the basis of a trend analysis of the calibration data, and the elapsed time is weighted with the current loading equivalents. Approaches to the aforementioned methods are disclosed, for example, in the Laid Open German Applications, Offenlegungsschriften DE 102004012420 A1, DE 102004063468 A1 and DE 102004063469 A1.

A broader approach to the status analysis of a pH-sensor is based, for example, on the so-called main component analysis and is disclosed in the pending German patent application No. 102006030895.6. In the case of the aforementioned approaches to the planning of calibration, or maintenance, measures and for the prognosis of remaining service lives, it becomes apparent that these model-based methods of proceeding ultimately fluctuate from measuring point to measuring point, wherein here the measuring point does not absolutely mean the place at which a sensor is used, but rather the specific conditions prevailing there, namely the type of medium, its flow velocity and its temperature. Other parameters which can influence the service life of a sensor are, for example, temperature jumps, dirt entrained in a medium, its aggressive properties, pH-jumps, vibrations of the equipment, the exceeding of limit values and the like.

Insofar as the number of relevant parameters is much too large, it is not practical to provide a universal model for the aging of sensors, which would enable a reliable estimation of the service times for the required maintenance measures at all measuring points, and under the specific conditions prevailing there. Furthermore, it appears not to make sense to overload a sensor unit to which only a limited electrical power is available, and which only includes a limited program memory and data memory, with a model that is complex in such a manner, even more so since this model does not relate to the core functions of the sensor, but rather relates only to the accompanying functions, which should monitor the verification of the functions.

This is all the more true, since pH-sensors are consumables, and the provided memory capacity in the sensor and the microprocessor power in the sensor are limited. Especially in the case of pH-measuring points, where the sensor unit is connected with the base unit via a plugged connection, which has an inductive interface, as available from the assignee under the mark "Memosens", the electrical power available to the sensor unit is limited, the more so since the sensor unit should also be suitable for explosion-endangered environments.

Furthermore, it is a requirement of complexity management and simplification of logistics, respectively, that, in the case of storage and in the case of pH-sensors, which are consumables, there should be differentiating on the basis of measuring points.

SUMMARY OF THE INVENTION

Thus, it is an object of the present invention to provide a method for the operation of measuring points which cares for the aforementioned requirements.

The object is achieved by the invention by a method of the field of the invention, wherein, according to the invention, at least one software module is transmitted from the base unit to the sensor unit and stored in the program memory of the sensor unit, wherein the software module enables for the sensor unit supplemental functions for monitoring the primary sensor. Furthermore, the invention includes a corresponding measuring point as well as sensor units for such measuring points.

This software module can then be designed, for example, measuring point specifically and can enable especially a prognosis of calibration times, as well as maintenance measures, taking into consideration the special features of the respective measuring point.

Furthermore, a software module can include a function for the analysis of the aging behavior of the primary sensor under the conditions of the measuring point.

In a further development of the invention, the sensor unit communicates to the base unit, at the start-up of the sensor unit, information concerning sensor type and type and version of the software modules already stored in the program memory. Consequently, the base unit can check whether the type and the version of the software modules present, in given cases, in the sensor unit are suited for the measuring point. On occasion, the base unit can hold measuring-point-specific software modules in a memory and transmit them to the sensor unit when needed. This can especially be the case when the sensor unit still does not include software modules that fit the measuring point, or when the software modules that are present in the memory of the sensor unit are out of date. A software module is out of date, when, for example, a more current version of the software module is present.

In a further development of the method of the invention, the base unit transmits the information received from the sensor about the sensor type and about the type or version of the software modules stored in the program memory of the sensor unit to a superordinated unit of the process monitoring installation, whereupon the superordinated unit checks whether more suitable, or more current software modules are available for the sensor type at the specific measuring point, and wherein, when applicable, the more suitable, or more current software modules are transmitted to the base unit. The base unit can then forward these more suitable or more current software modules to the sensor unit. As a result, the method of the invention enables a simple updating and adapting of the sensor units, especially pH-sensors, to the particular measuring point. This enables simplified storage, or warehousing, of the pH-electrodes.

Measuring point for determining a value of a physical or chemical, measured variable of a medium, wherein the measuring point includes a base unit and a sensor unit, wherein the sensor unit is releasably connectable with the base unit via a pluggable connector coupling;

the base unit is provided for energy supply of the sensor unit, for data exchange with the sensor unit and for communication of a signal representing the value of the measured variable to a process monitoring installation, wherein the base unit includes:

A first element of the pluggable connector coupling;
a first microprocessor for conditioning data, which are received by the sensor unit, for communication to the process monitoring installation;
a first data memory for storage of measuring-point-specific data; the sensor unit has a primary sensor and a sensor head, wherein the sensor head is firmly connected with the primary sensor;

the primary sensor is contactable with the medium, wherein the primary sensor includes a transducer with a signal output, which outputs an electrical signal that is dependent on the value of the measured variable, wherein the transducer has a variable transfer function;

wherein the sensor head includes:

A circuit for conditioning the transducer signals, wherein the circuit has an A/D converter and a second microprocessor for processing the digitized signals;
a second data memory, in which sensor-specific data are stored;
a program memory which contains a low-level software with base functionalities for operation of the sensor unit;
and an interface, via which energy supply of the sensor unit by the base unit and data exchange with the base unit occur, wherein the interface includes a second element of the pluggable connector coupling;
wherein, additionally, at least one software module is transmittable from the base unit to the sensor unit and storable in the program memory of the sensor unit, wherein the software module contains supplemental functions for monitoring the primary sensor.

BRIEF DESCRIPTION OF THE DRAWINGS

The invention will now be explained in greater detail based on the example of an embodiment shown in the drawing, the figures of which show as follows.

DETAILED DISCUSSION IN CONJUNCTION WITH THE DRAWINGS

Figure 1:
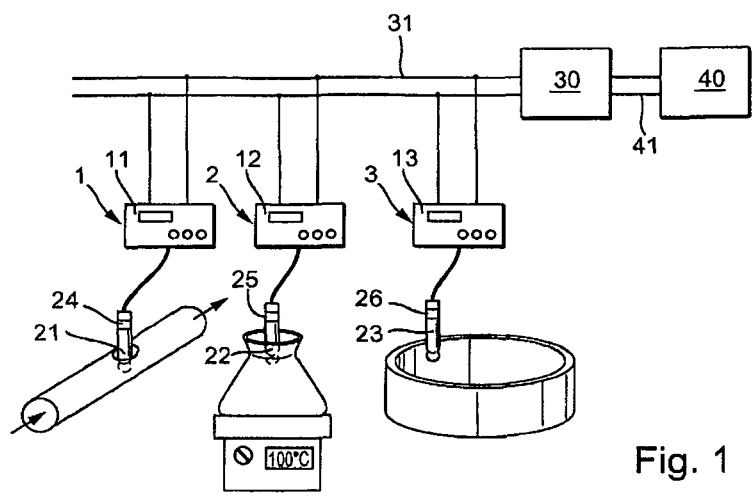
FIG. 1 is a schematic arrangement of a process monitoring installation for performing the method of the invention.

The process monitoring installation shown in FIG. 1 includes, for example, three measuring points 1, 2, 3 which have, in each case, a base unit 11, 12, 13 and a sensor unit 21, 22, 23, whose details will now be explained on the basis of FIGS. 1 and 2.

In the example of an embodiment, the sensor units are pH-sensors, which have, in each case, a primary sensor 21, 22, 23 in the form of a single-rod measuring chain and a sensor head 24, wherein the sensor head is firmly connected with the single-rod measuring chain. By firm connection it is meant that the single-rod measuring chain cannot be separated from the sensor head 24 by the user without damage. Other details will now be explained on the basis of FIG. 2. The signal output of the single-rod measuring chain 210, which transduces the current pH-value to a potential difference between a reference potential and a pH-dependent potential, is fed to a circuit for conditioning the signals of the single-rod measuring chain in the sensor head 24, wherein the circuit has an A/D converter 242 and a microprocessor 243 for processing the digitized signals. A temperature signal is also output by the single-rod measuring chain. The sensor head also contains a data memory 241, in which sensor-specific data are stored, for example, calibration data and their history, data about loading history, such as pH-extreme values and their duration, temperature extreme values and their duration, limit value exceedings, etc., logistical data and data about the software provisions of the sensor unit.

Furthermore, the sensor head contains a program memory 245, which contains a boot loader and low-level software with base functionalities for operation of the sensor unit, namely the so called firmware. Moreover, the program memory can also contain software modules, which will be described below.

Furthermore, the sensor head contains a preferably inductively coupling interface 245, via which energy supply of the sensor unit 21 by the base unit 11 and the data exchange with the base unit 11 occur. The interface 114 includes a second element of an inductively coupling pluggable connector coupling, via which the sensor unit is connected to the base unit.

The base units 11, 12, 13 comprise, in each case, a complementary element of the pluggable connector coupling, as well as a microprocessor for conditioning data, which is received from the sensor unit, in order to transfer these then via a fieldbus 31 to a central computer 30 of the process monitoring installation.

Figure 2:
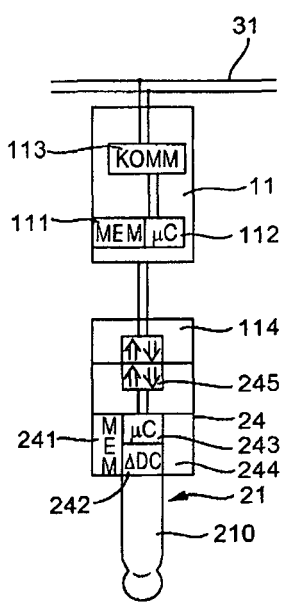
FIG. 2 is a schematic representation of the components of a measuring point.

The base units 11 include, as shown in FIG. 2 by way of example for the first base unit, a data memory 111 for the storage of measuring-point-specific data. These measuring-point-specific data can include, for example, information about which software modules are suitable for which sensor type at the particular measuring point. The software modules can especially contain algorithms for predictive maintenance. The base unit also includes a communication unit 113 by means of which the base unit communicates via a fieldbus with a superordinated unit, for example, the central computer 30 illustrated in FIG. 1.

According to the invention, at least one software module is transmitted from the base unit to the sensor unit and is stored in the program memory of the sensor unit, wherein the software module enables for the sensor unit supplemental functions for monitoring the primary sensor.

This software module is designed measuring point specifically, and enables, for example, a prognosis of calibration times and other maintenance measures taking into consideration the special features of the particular measuring point.

For example, a software module can contain for the first measuring point 1 the modeling of the aging of the primary sensor, or the determining of the calibration points in time for a flowing medium, which affects the pH-electrode abrasively or plugs the diaphragm of the reference electrode of the single-rod measuring chain, because of entrained dirt. In this case, supplemental data from other sensors can be transmitted, for example, about the current entrained dirt and the flow rate through the measuring point, in order for the sensor unit to take into consideration these data in ascertaining current loading in addition to determining pH and temperature. In order to keep the data from other sensors available, the measuring point can be supplied, for example from a superordinated unit such as the central computer 30, via the fieldbus, with the required data, at a suitable updating rate, which can be lower than the data transmission rate from the other sensors to the superordinated unit. The data can already be statistically evaluated by the superordinated unit, for example, by time averaging, integration, or combining of data from various sensors. Such data combinations can include products, quotients or any other functions or the data. Thus, for example, the integral of the product of the solids fraction of a liquid medium and the flow rate can be transmitted periodically from the superordinated unit to the measuring point, in order to take the abrasive loading into consideration when determining the aging of the sensor in the measuring point. By the preevaluation in the superordinated unit, the data traffic on the fieldbus is reduced. In order to reduce the data traffic still further, the evaluated data of other sensors, or combinations of other sensors, can be converted by the superordinated unit into index values relevant to aging, which are then transmitted to the measuring point and are taken into consideration by the measuring-point-specific software module in determining the degree of aging or the remaining service life, until a calibration or a maintenance measure.

The second measuring point 2 concerns, for example, a high temperature process in alkaline media. Here the aging is sufficiently well modelable, for example, on the basis of loading equivalents, which are a function of pH and T. It is important, however, to ensure that for the sensor type installed in each case, for example glass electrode or ISFET sensor, the suitable algorithm is loaded.

At the third measuring point 3, other specific conditions can be present, for example, a measured medium which degrades the service life of the reference electrolytes.

In all the aforementioned examples, the sensors, even with equal histories of pH-value and temperature, would age differently due to the aforementioned special features of the measuring points. Correspondingly, according to the invention, measuring-point-specific algorithms in the form of software modules are to be provided for sensor monitoring.

In a further development of the invention, at the start-up of the sensor unit, the sensor unit 21, 22, 23 communicates information about the sensor type and about the type and the version of the software modules that are already stored in the program memory to the base unit 22, 23, 24. Consequently, the base unit can check whether the type and the version of the software modules present in the sensor unit are suited for the measuring point. On occasion, the base unit can keep measuring-point-specific software modules ready in a memory and transmit them to the sensor unit when needed.

This can especially be the case when the sensor unit still includes no software modules that fit the measuring point, or when the software modules present in the memory of the sensor unit are already out-of-date. A software module is out-of-date, for example, when a more current version of the software module exists.

In a further development of the method of the invention, the base unit transmits the information received from the sensor unit about the sensor type and about the type and about the version of the software modules stored in the program memory of the sensor unit to the central computer 30 of the process monitoring installation, whereupon the superordinated unit checks whether more suitable, or more current software modules are available for the sensor type at the specific measuring point, and wherein the more suitable or more current software modules are transmitted, when applicable, to the base unit. The base unit can then save these more suitable, or more current, software modules in the data memory and forward them to the sensor unit. Furthermore, an inquiry can be placed via the central computer 30, for example, via the Internet to the manufacturer of the sensors, as to which software module is suitable for an ascertained sensor type at a certain measuring point. This can then be downloaded via the Internet into the central computer 30 and can be transmitted via the fieldbus system of the central computer to the base unit of the measuring point.

As a result, the method of the invention enables a simple updating and adapting of the sensor units, especially pH-sensors, at the particular measuring point, which enables a simplified storage of the pH-electrodes.

In addition to the aforementioned embodiments of the invention, software modules are, if necessary, also loadable via a mobile service device, for example, a portable computer. For this, a corresponding service-interface can be provided on the sensor unit or on the base unit. The service-interface can comprise a plug connector or a radio link, for example, a "Bluetooth" radio link. It can occur, for example, in this manner: the service device queries the data of the measuring point via the interface and then provides a software module stored in the service device via the service-interface.

To the extent that the service device stores no suitable software module, such can, in given cases, on the basis of the measuring point data, be requested and downloaded from a server by the service device via W-LAN, before it is then provided to the measuring point via the service interface. In this way, the fieldbus is not loaded with data traffic due to the transmission of software modules.

Instead of measuring-point-specific software modules for monitoring the sensors, an updating of the low-level software and of the so called firmware can basically occur in the aforementioned manner.

The invention claimed is:

1. A method for operating a measuring point for determining a value of a physical or chemical, measured variable of a medium, wherein the measuring point includes a base unit and a sensor unit, comprising the steps of:
    providing a releasable connection of the sensor unit with the base unit via a pluggable connector coupling;
    providing the base unit for energy supply of the sensor unit, for data exchange with the sensor unit and for communicating a signal representative of a value of the measured variable to a process monitoring installation; and
    at least one software module is transmitted from the base unit to the sensor unit and is stored in the program memory of the sensor unit, wherein the software module unit enables for the sensor supplemental functions for monitoring the primary sensor;
    wherein the software module is measuring point specific and, includes a function for analysis of the aging behavior of the primary sensor under the conditions of the measuring point;
    wherein, the base unit includes:
    a first element of the pluggable connector coupling;
    a first microprocessor for conditioning data, which has been received from the sensor unit, for communication with the process monitoring installation;
    a first data memory for saving measuring-point-specific data;
    the sensor unit has a primary sensor and a sensor head, wherein the sensor head is firmly connected to the primary sensor; and
    the medium acts on the primary sensor, which includes a transducer with a signal output, which outputs an electrical signal that is dependent on the value of the measured variable, wherein the transducer has a variable transfer function;
    further wherein, the sensor head includes:
    a circuit for conditioning the transducer signals, wherein the circuit has an A/D converter and a second microprocessor for processing the digitized signals;
    a second data memory in which sensor-specific data are stored;
    a program memory, which contains low-level software with base functionalities for operation of the sensor unit; and
    an interface, via which energy supply of the sensor unit by the base unit and the data exchange with the base unit occur, wherein the interface includes a second element of the pluggable connector coupling.

2. The method as claimed in claim 1, wherein:
    at start-up of the sensor unit, the sensor unit communicates information about sensor type and about type and version of software modules stored in program memory in the base unit.

3. The method as claimed in claim 2, wherein:
    the base unit checks whether the type and version of the software modules are suitable for the measuring point.

4. The method as claimed in claim 3, wherein:
    the base unit holds measuring-point-specific software modules in a memory and transmits them to the sensor unit when needed.

5. The method as claimed in claim 2, wherein:
    the base unit communicates the information about the sensor type and about the type and the version of the software modules stored in the program memory of the sensor unit to a superordinated unit of the process monitoring installation;
    the superordinated unit checks, whether more suitable, or more current software modules are available for the sensor type at the measuring point; and
    when applicable, the more suitable, or more current software modules are transmitted to the base unit.

6. A measuring point for determining a value of a physical or chemical, measured variable of a medium, comprising:
    a base unit; and
    a sensor unit, said sensor unit being releasably connected with said base unit via a pluggable connector coupling wherein:
    said base unit is provided for energy supply of the sensor unit, for data exchange with the sensor unit and for communicating a signal representative of the value of the measured variable to a process monitoring installation;
    said base unit includes: a first element of the pluggable connector coupling;
    a first microprocessor for conditioning data, which has been received from the sensor unit, for communication with the process monitoring installation;
    a first data memory for saving measuring-point-specific data;
    the sensor unit has a primary sensor and a sensor head, wherein the sensor head is firmly connected with the primary sensor;
    the primary sensor is contactable with medium, wherein the primary sensor includes a transducer with a signal output, which outputs an electrical signal dependent on the value of the measured variable, wherein the transducer has a variable transfer function;
    said sensor head includes: a circuit for conditioning the transducer signals, wherein the circuit has an A/D converter and a second microprocessor for processing the digitized signals;
    a second data memory, in which sensor-specific data are stored;
    a program memory, which contains low-level software with base functionalities for operation of the sensor unit; and
    an interface, via which energy supply of the sensor unit by the base unit and data exchange with the base unit occurs, wherein the interface includes a second element of the pluggable connector coupling; and
    at least one software module is transmittable from the base unit to the sensor unit and is storable in the program memory of the sensor unit, wherein the software module contains supplemental functions for monitoring the primary sensor
    wherein the software module is measuring point specific and includes a function for analysis of the aging behavior of the primary sensor under the conditions of the measuring point.

7. A sensor unit for a measuring point as claimed in claim 6, wherein:

said sensor unit has a primary sensor and a sensor head, said sensor head being firmly connected with the primary sensor;

said primary sensor is contactable by the medium, said primary sensor includes a transducer with a signal output, which outputs an electrical signal dependent on the value of the measured variable, said transducer has a variable transfer function; and said sensor head includes: a circuit for conditioning the transducer signals, wherein the circuit has an A/D converter and a second microprocessor for processing the digitized signals;

a second data memory, in which sensor-specific data are stored;

a program memory, which contains low-level software with base functionalities for operation of the sensor unit; and an interface, via which energy supply of the sensor unit by the base unit and data exchange with the base unit occur, wherein the interface includes a second element of the pluggable connector coupling; and at least one software module is transmittable from the base unit to the sensor unit and storable in the program memory of the sensor unit, said software module contains supplementary functions for monitoring the primary sensor.

* * * * *